Dec. 1, 1970 P. GATES 3,543,432
FISHING ROD HOLDER
Filed April 4, 1969
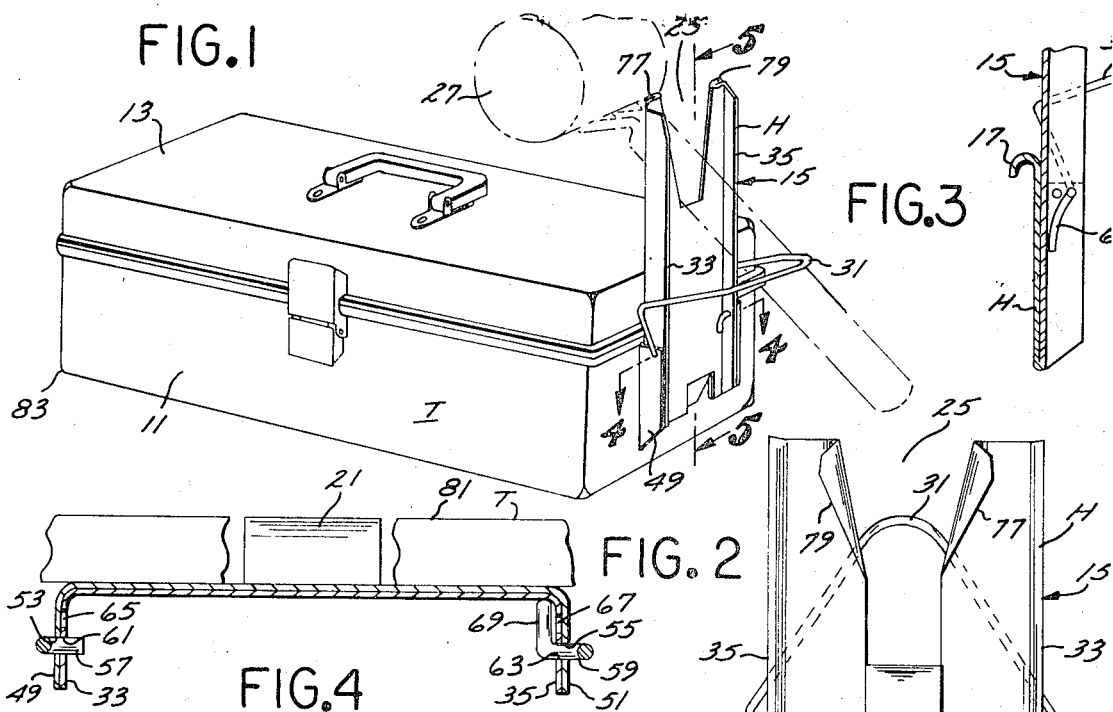
INVENTOR.
PAUL GATES
BY Fulwider, Patton, Rieber
Lee and Utecht
ATTORNEYS United States Patent Office 3,543,432
Patented Dec. 1, 1970

3,543,432
FISHING ROD HOLDER
Paul Gates, 2675 Fashion Ave.,
Long Beach, Calif. 90810
Filed Apr. 4, 1969, Ser. No. 813,605
Int. Cl. A01k 97/00
U.S. Cl. 43—54.5      9 Claims

ABSTRACT OF THE DISCLOSURE

A fishing rod holder for securement to a tackle box having a lid, such holder including a vertical frame having an upwardly-opening yoke for passage of the fishing rod and being formed with intermediate mounting tabs for receipt between the lid and the top of the sidewall of such box. A bail is secured to the frame and forms a loop for receiving the butt end of the fishing rod.

BACKGROUND OF THE INVENTION

Field of the invention

The present invention relates generally to fishing rod holders and, more particularly, to fishing rod holders which may be removably secured to tackle boxes.

Description of the prior art

Most conventional fishing rod holders are not adapted for convenient mounting on tackle boxes and those which are so adapted require modification of the tackle box.

SUMMARY OF THE INVENTION

The fishing rod holder of present invention is characterized by a frame having a mounting tab for insertion between the lid and top of the sidewall of the tackle box and formed on its upper extremity with a stop for abutment against the tackle box wall to limit rotation about the mounting tab. The frame includes an upwardly-opening yoke for receipt of the fishing rod and a bail is mounted on the frame for receipt of the butt end of such fishing pole.

It is an object of the present invention to provide a fishing rod holder which may be conveniently secured to a fishing tackle box without modification of such box.

Another object of the present invention is to provide a fishing rod holder of the type described which will provide a stable support for such rod.

An additional object of the present invention is to provide a fishing rod holder of the type described which is compact for convenient storage in a tackle box.

A further object of the present invention is to provide a fishing rod holder of the type described which can be conveniently secured to many different styles of fishing tackle boxes.

A still further object of the present invention is to provide a fishing rod holder of the type described which is economical and convenient to manufacture.

These and other objects and the advantages of the present invention will become apparent from a consideration of the following detailed description when taken in conjunction with the accompanying drawing.

DESCRIPTION OF THE DRAWING

FIG. 1 is a perspective view of a fishing rod holder of present invention mounted on a tackle box;

FIG. 2 is an elevational front view, in enlarged scale, of the fishing rod holder shown in FIG. 1;

FIG. 3 is a vertical sectional view taken along the line 3—3 of FIG. 2;

FIG. 4 is a horizontal sectional view, in enlarged scale, taken along the line 4—4 of FIG. 1;

FIG. 5 is a vertical sectional view, in enlarged scale, taken along the line 5—5 of FIG. 1;

FIG. 6 is a side view of a modification of the fishing rod holder shown in FIG. 1; and FIG. 7 is a side view of a modification of the fishing rod holder shown in FIG. 1.

DESCRIPTION OF THE PREFERRED EMBODIMENT

The fishing rod holder H is intended for securement to a tackle box T which includes a lower box portion 11 having a lid 13 hinged thereto. The holder H includes a vertical frame, generally designated 15, having a pair of mounting tabs 17 and 18 (FIGS. 2 and 5) which overlie the top extremity 19 of the end wall of the tackle box and is held captive by the lid 13. Stops 21 and 23 project inwardly from the lower and upper extremities of the frame 15 to limit the rotation of such frame about the mounting tabs 17 and 18. The frame 15 includes an upward-opening V-shaped yoke for receipt of a rod 27 and a bail 31 is supported from the frame 15 for receiving the butt end of the rod 27.

The frame 15 is made of sheet metal and is formed with a pair of rearwardly-projecting side flanges 33 and 35. The lower extremity of the frame 15 is bent back on itself at 39 (FIG. 5) and extends upwardly to bend forwardly and downwardly to form the mounting tabs 17 and 18. The lower stop, or spacer, 21 is formed by a tab resulting from a pair of vertical slits 43 and 45 (FIG. 2) cut in the lower extremity of the frame 15 to enable the stop 21 to be bent inwardly for abutting the vertical end wall of the box T.

Referring to FIG. 4, the turned-back portion of the frame 15 is formed with a pair of rearwardly-projecting side flanges 49 and 51 which overlie the side flanges 33 and 35 of the frame 15. The flanges 49 and 51 are formed with respective bores 53 and 55 which receive inwardly-bent hinge elements 57 and 59, respectively, formed by the extremities of the bail 31. Disposed in selective alignment with the respective bores 53 and 55 are two pairs of bores 61 and 63 and 65 and 67 formed in the flanges 33 and 35. Thus, when the holder is mounted on the style of box shown in FIG. 5 the upwardly-turned portion 40 will be bent to lie flat against the frame 15 and the hinge elements 57 and 59 will be inserted through the respective bores 53 and 55 and through the bores 61 and 63. Alternatively, the upwardly-turned portion 40 may be bent to angle slightly away from the frame 15 and the hinge elements 57 and 59 will be registered with the bores 65 and 67 as shown in FIG. 7.

Referring to FIGS. 3 and 4, the inwardly-projecting hinge element 59 is bent downwardly to form a stop 69 which engages the vertical frame 15 to limit downward rotation of the bail 31 (FIG. 1).

Referring to FIGS. 1 and 2, it will be noted that the yoke 25 is formed by cutting out a portion 73 of the frame 15 and bending such portion forwardly and downwardly and then back to form a horizontal brace portion 75 (FIG. 5). The upper edges 77 and 79 of the yoke 25 are curled back to form a funnel shape.

In operation, the fisherman will form the holder H for his particular tackle box T by adjusting the top and bottom spacers 23 and 21 and the mounting tabs 17 and 18. The mounting tabs 17 and 18 are adjusted in accordance with the length and thickness of the lid overhang 81 (FIG. 5). For the metal box shown in FIG. 5, the turned-back portion 40 may be in juxtaposition with the frame 15 and the hinge elements 57 and 59 will be inserted in the bores 61 and 63.

It will be noted that the stops 21 and 23 may be adjusted to set the holder at the proper angle for the weight and balance of any fishing rod. The holder H is conveniently mounted on the box T by raising the lid 13 slightly and inserting the mounting tabs 17 and 18, and then closing and fastening the lid 13. The bail 31 can then be pivoted to its outward position shown in FIG. 1 where its stop 69 will engage the frame 15 and the fishing rod 27 may then be installed as shown. The reel of the rod will be set to provide a selected amount of drag whereby when a fish strikes, the reel will slightly resist line feed out and the fisherman will be alerted. It is of particular importance that the holder H is mounted at one end of the box and the pole 27 projects upwardly and forwardly over the box whereby the force of a striking fish will tend to rotate the box about the remote lower corner 83 (FIG. 1) thereby providing a relatively long lever arm for action of the weight of the box T and its contents in resisting such rotation and consequent overturning of the box T.

The fishing rod holder shown in FIG. 6 is substantially the same as that shown in FIG. 1 except that the mounting tabs 17 and 18 are shaped to accommodate the box and lid arrangement for a wooden tackle box T' or other similarly-shaped boxes. In this arrangement, the stops 21 and 23 are allowed to lie flat against the frame 15.

The embodiment shown in FIG. 7 is formed with upwardly mounting tabs 17 and 18 which hook over the upper end of the sidewall of a plastic tackle box, it being noted that the pivot elements 57 and 59 are received in the bores 65 and 67 to accommodate the relatively thick overhang 89.

From the foregoing it will be obvious that the fishing rod holder of present invention is readily adjusted for securement to many different style tackle boxes without modification of such boxes. Further, the holder is compact to store and, in combination with the tackle box, provides a stable support for the fishing rod.

Various modifications and changes may be made with regard to the foregoing detailed description without departing from the spirit of the invention.

I claim:

1. A fishing rod holder for removable securement to a fishing tackle box having a lid, said holder comprising:
    a frame including a mounting tab for insertion between the lid and upper extremity of the sidewall of said box, a stop on the upper extremity of said frame for abutting the wall of said lid to limit rotation of said frame about said tab, and a yoke for receiving a portion of a fishing rod; and
    a bail connected to said frame for receiving the butt end of said rod whereby said tab may be inserted between said upper extremity and said lid, said lid when closed holding said tab captive, and a fishing rod placed in said yoke and hooked under said bail to support said fishing rod projecting upwardly and forwardly over said box.

2. A fishing rod holder as set forth in claim 1 wherein:
    said stop is adjustable to space the upper extremity of said frame selected distances from the wall of said tackle box to provide selected angles for said holder.

3. A fishing rod holder as set forth in claim 1 wherein:
    said frame includes an adjustable stop on its lower extremity for adjustment to abut the wall of said box and space said lower extremity selected distances therefrom.

4. A fishing rod holder as set forth in claim 1 wherein:
    said mounting tab is adjustable to space said frame selected distances from the wall of said tackle box.

5. A fishing rod holder as set forth in claim 1 wherein:
    said frame includes side flanges having a pair of aligned passages therethrough; and
    said bail is formed with a pair of inwardly-projecting hinge portions received in said passages and a stop for limiting downward pivoting thereof.

6. A fishing rod holder as set forth in claim 2 wherein:
    said frame includes an adjustable stop on its lower extremity for adjustment to abut the wall of said box to space said lower extremity selected distances therefrom.

7. A fishing rod holder as set forth in claim 2 wherein:
    said mounting tab is adjustable to space said frame selected distances from the wall of said tackle box.

8. A fishing rod holder as set forth in claim 4 wherein:
    said frame includes a pliable portion which is turned back from its lower extremity, the upper extremity of said portion forming said mounting tab.

9. A fishing rod holder as set forth in claim 8 wherein:
    said frame includes side flanges having a plurality of pairs of aligned passages therethrough and said turned-back portion is formed with rearwardly-projecting side flanges which include passages for alignment with selected pairs of said passages in said frame; and
    said bail is formed with inwardly-turned hinge portions for selective engagement in said passages to hold said turned-back portion in adjustment with respect to said frame.

References Cited

UNITED STATES PATENTS

| | | | |
|---|---|---|---|
| 1,110,150 | 9/1914 | Slavin et al. | 190—60 |
| 2,555,073 | 5/1951 | Zdankoski | 43—21.2 X |
| 2,596,403 | 5/1952 | Hoffman | 43—21.2 |
| 3,095,663 | 7/1963 | Miller | 43—21.2 |
| 3,327,978 | 6/1967 | Gates | 248—42 |

SAMUEL KOREN, Primary Examiner

D. J. LEACH, Assistant Examiner

U.S. Cl. X.R.

43—21.2; 248—42